(12) United States Patent
Watanabe

(10) Patent No.: US 9,291,267 B2
(45) Date of Patent: Mar. 22, 2016

(54) GASKET AND METHOD FOR PRODUCING SAME

(75) Inventor: Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 88 days.

(21) Appl. No.: 13/881,396

(22) PCT Filed: May 24, 2012

(86) PCT No.: PCT/JP2012/063336
§ 371 (c)(1),
(2), (4) Date: Apr. 25, 2013

(87) PCT Pub. No.: WO2012/169366
PCT Pub. Date: Dec. 13, 2012

(65) Prior Publication Data
US 2013/0228984 A1    Sep. 5, 2013

(30) Foreign Application Priority Data

Jun. 9, 2011   (JP) .................................. 2011-129291

(51) Int. Cl.
*F16J 15/10*   (2006.01)
*F16J 15/06*   (2006.01)
(Continued)

(52) U.S. Cl.
CPC ................ *F16J 15/10* (2013.01); *F16J 15/061* (2013.01); *F16J 15/104* (2013.01); *F16J 15/122* (2013.01); *F16J 15/127* (2013.01); *F16J 2015/0856* (2013.01)

(58) Field of Classification Search
CPC ....... F16J 15/022; F16J 15/061; F16J 15/104; F16J 15/106; F16J 15/12; F16J 15/121; F16J 15/122; F16J 15/123; F16J 15/127; F16J 2015/0856

USPC ......... 277/591–594, 596, 598, 630, 637, 639, 277/644, 648, 649, 652
See application file for complete search history.

(56) References Cited

U.S. PATENT DOCUMENTS 871,178 A  *  11/1907  Ostrander ..................... 428/167
3,362,735 A    1/1968  Maxeiner
(Continued)

FOREIGN PATENT DOCUMENTS

| CN | 101454599 A | 6/2009 |
| EP | 1566582 A1 | 8/2005 |

(Continued)

OTHER PUBLICATIONS

Extended Euorpean Search Report for Application No. EP 12 84 6866 dated Mar. 19, 2015 (3 pages).

*Primary Examiner* — Kristina Fulton
*Assistant Examiner* — Nicholas L Foster
(74) *Attorney, Agent, or Firm* — Harness, Dickey & Pierce, P.L.C.

(57) ABSTRACT

In order to inexpensively provide gaskets which have good sealing performance, and which fulfill various applications by simply stamping out sheet-like gaskets in accordance with specifications, a gasket is obtained by integrally forming, with a sheet-like base material, a gasket part made of a rubber-like elastic material on at least one surface of the base material, said gasket part being composed of continuous protrusions provided with a fixed pattern. The sheet-like gasket parts produced in this manner are capable of inexpensively providing gaskets which fulfill various applications by simply stamping out the sheet-like gasket parts in accordance with various specifications.

1 Claim, 10 Drawing Sheets

(51) Int. Cl.
*F16J 15/12* (2006.01)
*F16J 15/08* (2006.01)

(56) References Cited

U.S. PATENT DOCUMENTS

| | | | |
|---|---|---|---|
| 3,930,656 A * | 1/1976 | Jelinek | 277/611 |
| 4,650,362 A | 3/1987 | Kubo | |
| 4,880,669 A * | 11/1989 | Dorn et al. | 427/210 |
| 5,700,015 A * | 12/1997 | Tensor | F16J 15/123 277/591 |
| 6,530,575 B2 * | 3/2003 | Poquet et al. | 277/592 |
| 7,905,498 B2 * | 3/2011 | Dempsey et al. | 277/649 |
| D732,149 S * | 6/2015 | Young | D23/269 |
| 2005/0127615 A1 | 6/2005 | Matsuki et al. | |
| 2005/0280214 A1* | 12/2005 | Richards | 277/608 |
| 2007/0075505 A1 | 4/2007 | Itoi et al. | |
| 2007/0228668 A1 | 10/2007 | Dempsey et al. | |
| 2008/0280040 A1 | 11/2008 | Barrall et al. | |
| 2010/0253012 A1* | 10/2010 | Zhuang | C09J 7/0217 277/637 |
| 2013/0341874 A1* | 12/2013 | Aykanat | F16L 23/18 277/612 |

FOREIGN PATENT DOCUMENTS

| | | |
|---|---|---|
| FR | 2367960 A1 | 5/1978 |
| JP | S56-21650 U | 2/1981 |
| JP | S58-123963 U | 8/1983 |
| JP | S63-19548 U | 2/1988 |
| JP | 08-240271 A | 9/1996 |
| JP | 11-037294 A | 2/1999 |
| JP | 2002-156044 A | 5/2002 |
| JP | 2007-092904 A | 4/2007 |
| JP | 2008-223946 A | 9/2008 |
| JP | 2009-531636 A | 9/2009 |
| JP | 2009-299903 A | 12/2009 |
| JP | 2010-138972 A | 6/2010 |
| WO | WO-2007-126978 A2 | 11/2007 |

* cited by examiner

GASKET AND METHOD FOR PRODUCING SAME

CROSS-REFERENCE TO RELATED APPLICATIONS

This application is a U.S. National Stage Application of International Application No. PCT/JP2012/063336 filed on May 24, 2012, and published in Japanese as WO 2012/169366 A1 on Dec. 13, 2012. This application claims priority to Japanese Application No. 2011-129291 filed on Jun. 9, 2011. The disclosures of the above applications are incorporated herein by reference.

BACKGROUND OF THE INVENTION

1. Field of the Invention

The present invention relates to a gasket and its manufacturing method, and more particularly to a gasket which can easily and securely obtain a sheet-like gasket having a good sealing performance, and a manufacturing method for the gasket.

2. Description of the Conventional Art

Conventionally, in order to seal a gap between housings in an engine cam cover, a fuel cell, an electronic device and the like which are made of a resin material, a gasket made of a rubber-like elastic material has been used in the gap.

Further, as one example of this kind of gasket, a structure having a shape shown in FIG. 16 has been proposed (refer to Japanese Unexamined Patent Publication No. 2009-299903).

However, in this kind of gasket, since a chevron gasket portion 200 is formed on a surface of a base material 100 such as a metal material, a resin material or the like by using a metal mold, a sealing performance is good, however, it is necessary to prepare the metal mold per one specification, so that a problem that a manufacturing cost is increased has been brought about.

Accordingly, there has been proposed a sheet-like gasket structured, as shown in FIG. 17, such that a gasket portion 200 made of a rubber-like elastic material and having a fixed uniform thickness is bonded on a surface of a sheet-like base material 100 (refer to Japanese Unexamined Patent Publication No. 11-37294).

Since this kind of gasket can be provided for various intended uses only by punching the sheet-like gasket in correspondence to the specification, it has an advantage that the gasket can be provided inexpensively.

However, since the gasket comes into contact with the other surface to be sealed in a wide plane state, a high repulsive force is brought about with respect to the other member, and in the case that the other member is thin or fragile such as a resin material, a problem that the other member is deformed has been brought about.

Further, since the following property to the other member is low, a problem that the sealing performance is lowered at an early time due to a permanent strain of the rubber-like elastic material has been brought about.

Further, in the case that the sheet-like base material 100 having a low rigidity is used, and the gasket portion 200 is simultaneously formed on both front and back surfaces, it is hard to keep the sheet-like base material 100 at a planed position without deforming. Therefore, since it is necessary to form one surface by one surface, a low cost formation has been prevented.

SUMMARY OF THE INVENTION

An object of the present invention is to inexpensively provide a gasket which has a good sealing performance and complies with various intended uses only by punching a sheet-like gasket in correspondence to a specification.

In order to achieve the object mentioned above, according to the present invention, there is provided a gasket including a sheet-like base material, and a gasket portion which is made of a rubber-like elastic material and is integrally formed on at least one surface of the base material, wherein the gasket portion is constructed by a continuous projection portion which is provided with a fixed pattern.

Further, in order to achieve the object mentioned above, according to the present invention, there is provided a manufacturing method of a gasket including a step of integrally forming a gasket portion which is provided with a continuous projection portion having a fixed pattern and is made of a rubber-like elastic material, on a surface of a sheet-like base material, while pinching the base material by two metal molds, and a step of punching the gasket portion containing the base material into a fixed shape.

Effect of the Invention

The present invention achieves effects described below.

According to the gasket of the invention described in a first aspect, the sealing performance is good, and the gasket complying with the various intended uses can be inexpensively provided only by punching the sheet-like gasket in correspondence to the specification.

Further, according to the gasket of the invention described in a second aspect, a good sealing surface pressure is generated in the gasket portion, and an unnecessary strain is not generated in the base material.

Further, according to the gasket of the invention described in a third aspect, an integration between the base material and the gasket portion can be securely carried out, and it is possible to mechanically integrate particularly even in a base material having a bad adhesion property with the rubber material. Therefore, since it is possible to enhance a degree of freedom for selecting the base material and the rubber material, it is possible to expand a range of use, omit a bonding step and more inexpensively provide the gasket.

Further, according to the gasket of the invention described in a fourth aspect, it is possible to achieve a good sealing performance with a low repulsive force.

Further, according to the gasket of the invention described in a fifth aspect, since it is possible to avoid an excessive fastening of the gasket portion, the good sealing performance can be stably obtained over a long period of time.

Further, according to the gasket of the invention described in a sixth aspect, since it is possible to avoid the excessive fastening of the gasket without affecting the sealing performance of the gasket portion, the good sealing performance can be stably obtained over a long period of time.

Further, according to the gasket of the invention described in a seventh aspect, since it is possible to avoid the excessive fastening of the gasket portion even in a narrow sealing space, the good sealing performance can be stably obtained over a long period of time.

Further, according to the gasket of the invention described in an eighth aspect, it is possible to inexpensively form the gasket portion into a predetermined shape without deforming the base material.

Further, according to the gasket of the invention described in a ninth aspect, it is possible to comply with the intended uses of the various specifications.

DETAILED DESCRIPTION OF PREFERRED EMBODIMENT

A description will be given below of a best mode for carrying out the present invention.

Figure 1:
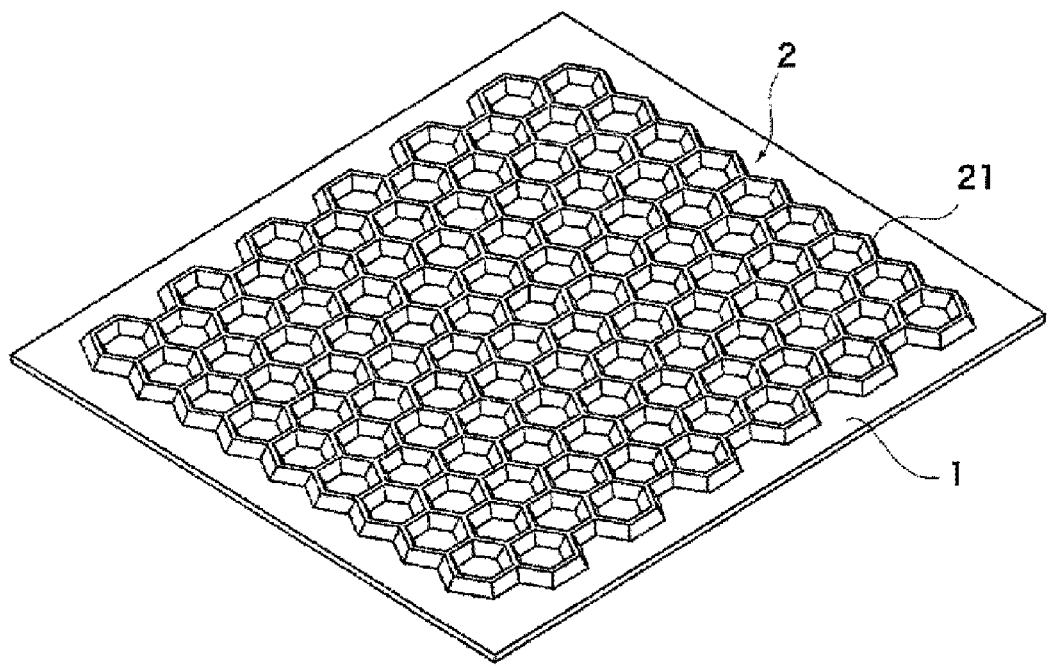
FIG. 1 is a three-dimensional perspective view of a gasket of a first embodiment according to the present invention.
Figure 2:
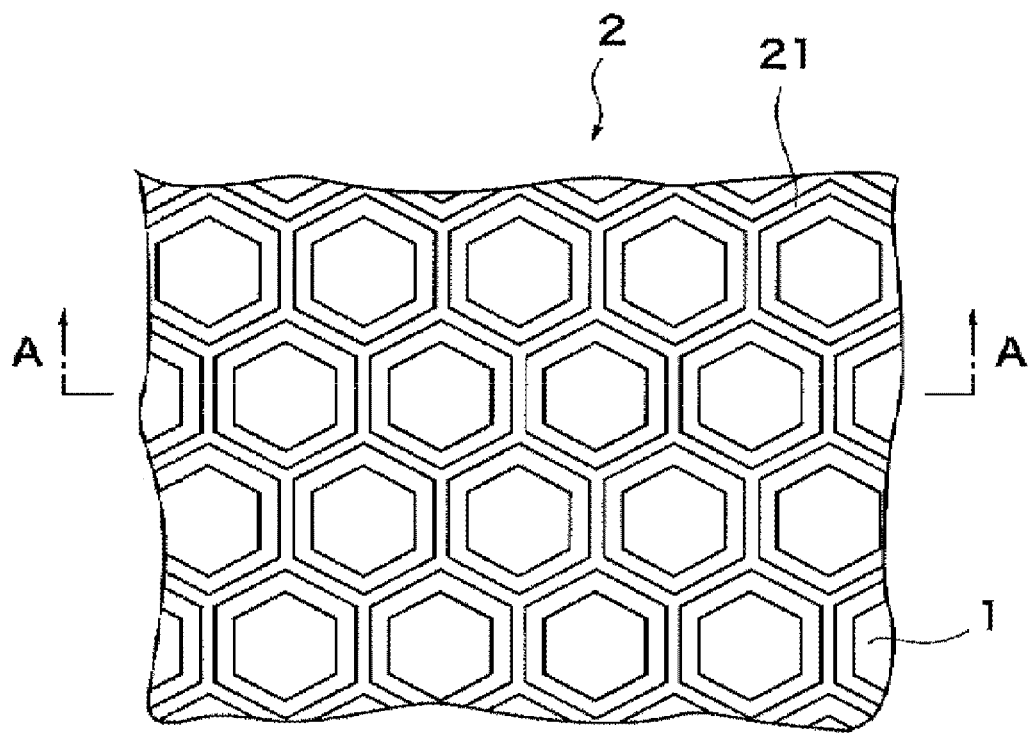
FIG. 2 is a partial plan view of the gasket shown in FIG. 1.
Figure 3:
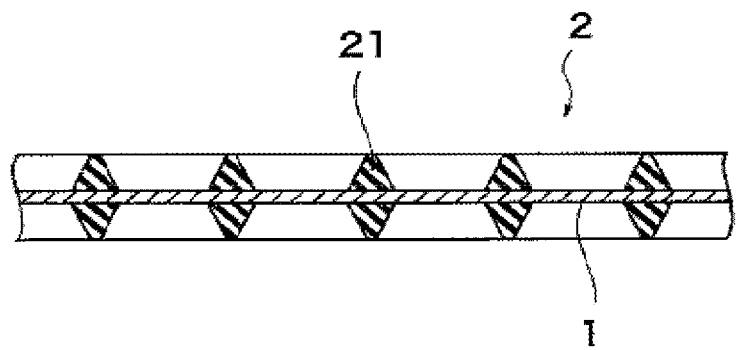
FIG. 3 is a cross sectional view along a line A-A in FIG. 2.

A gasket of a first embodiment according to the present invention is structured, as shown in FIG. 1 to FIG. 3, such that the gasket is provided with a sheet-like base material 1 which is made of a resin material, and a gasket portion 2 which is made of a rubber-like elastic material and is integrally formed on at least one surface of the base material 1.

Further, the gasket portion 2 is constructed by a continuous projection portion 21 which is provided with hexagonal repeated patterns as shown in the drawing.

Further, the projection portion 21 is formed in such a manner that the same patterns overlap on both front and back surfaces of the base material 1, as shown in FIG. 3.

Accordingly, a good sealing surface pressure is generated in the gasket portion 2, and an unnecessary strain is not generated in the base material 1.

Further, since a shape of the projection portion 21 is formed as a lip shape having a sharp leading end, a good sealing performance can be achieved with a low repulsive force.

A material used in the gasket portion 2 is a rubber material which is provided with a rubber-like elasticity.

As the rubber material, there can be listed up a nitrile rubber, an acrylic rubber, an EPDM, a CR, a silicone rubber, a fluorocarbon rubber, a natural rubber and the like, and they are used by being appropriately selected in correspondence to various intended uses.

Further, as a material used in the base material 1, there can be listed up resin materials such as a thermoplastic resin, a thermosetting resin and the like, a metal material and the like, and they are used by being appropriately selected in correspondence to the various intended uses.

The sheet-like gasket portion 2 manufactured as mentioned above can inexpensively provide the gasket complying with the various intended uses only by punching the sheet-like gasket portion 2 in correspondence to the various specifications.

Figure 4:
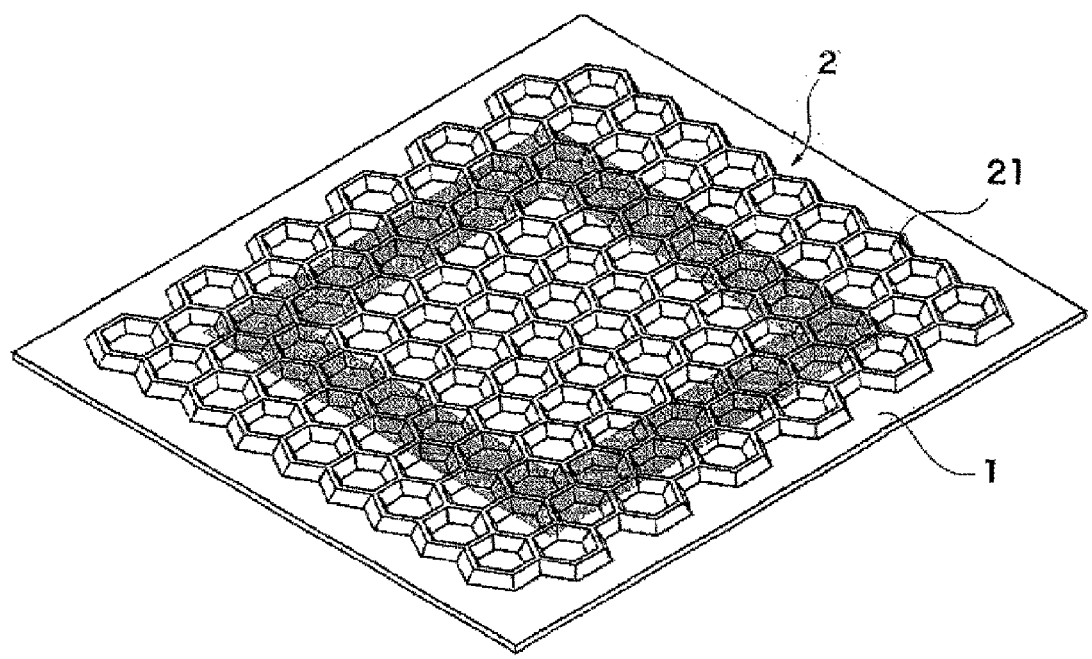
FIG. 4 is a view showing one example of a punching shape in correspondence to an intended use from the gasket shown in FIG. 1 by using a dark shade.

Specifically, as shown in FIG. 4, a target square frame-shaped gasket can be easily obtained by removing unnecessary inner portion and outer portion in such a manner as to leave the square frame-like gasket shown by a dark shade from the sheet-like gasket portion 2 shown in FIG. 1.

Figure 5:
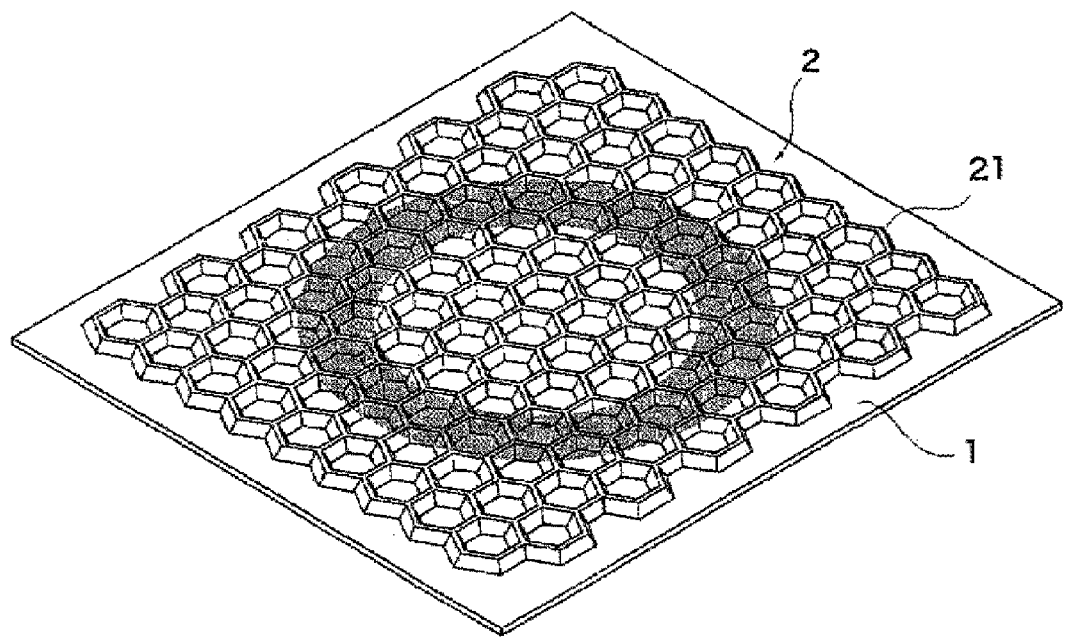
FIG. 5 is a view showing the other example of the punching shape in correspondence to an intended use from the gasket shown in FIG. 1 by using a dark shade.

Further, FIG. 5 shows a gasket of the other specification, and a target circular frame-shaped gasket can be easily obtained by removing unnecessary inner portion and outer portion in such a manner as to leave the circular frame-like gasket shown by a dark shade from the sheet-like gasket portion 2 shown in FIG. 1.

Figure 6:
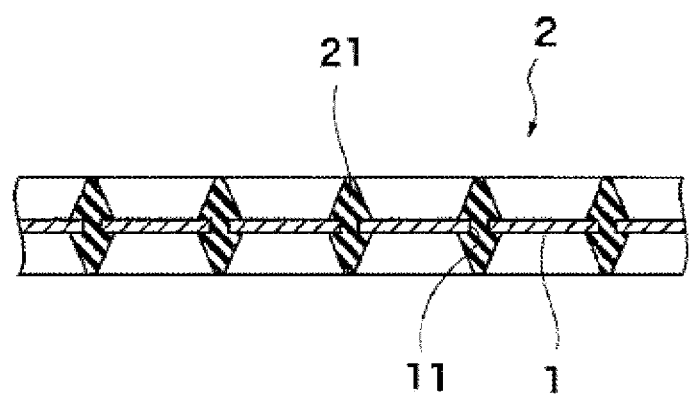
FIG. 6 is a view showing a gasket of a second embodiment according to the present invention in the same manner as FIG. 3.

Next, a description will be given of a gasket of a second embodiment according to the present invention on the basis of FIG. 6.

A different point from the gasket of the previously described first embodiment is a point that the projection portions 21 existing on both the front and back surfaces of the base material 1 are connected to each other via a through hole 11 provided in the base material 1.

According to the matter described above, since it is possible to securely carry out an integration of the base material 1 and the gasket portion 2, and it is possible to mechanically integrate particularly in the base material 1 having a bad adhesion property with the rubber material, it is possible to enhance a degree of freedom for selecting the base material 1 and the rubber material. Therefore, it is possible to expand a range of use, and it is possible to inexpensively provide the gasket by omitting a bonding step.

Figure 7:
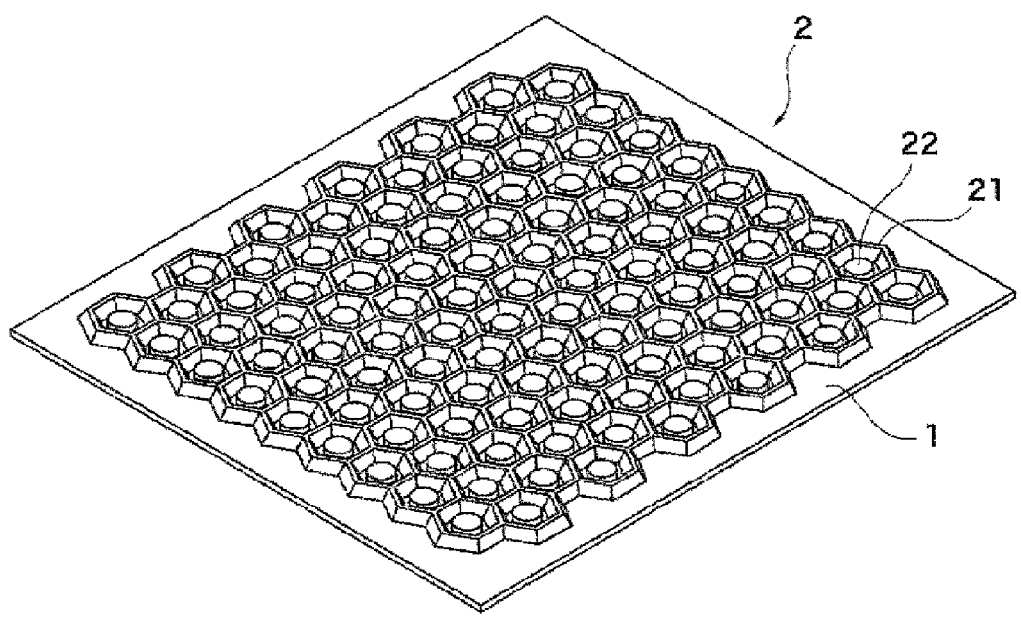
FIG. 7 is a view showing a gasket of a third embodiment according to the present invention in the same manner as FIG. 1.
Figure 8:
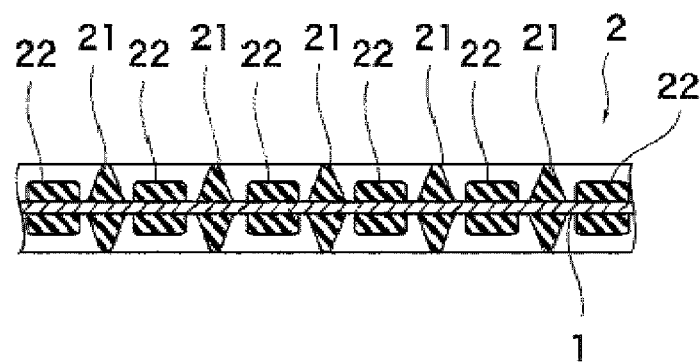
FIG. 8 is a view showing a gasket of the third embodiment according to the present invention in the same manner as FIG. 3.

Next, a description will be given of a gasket of a third embodiment according to the present invention on the basis of FIG. 7 and FIG. 8.

A different point from the gasket of the previously described first embodiment is a point that positioning projections 22 which are lower than a height of the projection portion 21 are formed on the surface of the base material 1.

More specifically, the positioning projections 22 are designed to exist separately in such a manner as to be surrounded by the hexagonal projection portions 21.

According to the matter described above, since it is possible to avoid an excessive fastening of the gasket portion 2 without affecting the sealing performance of the gasket portion 2, a good sealing performance can be stably obtained over a long period of time.

Figure 9:
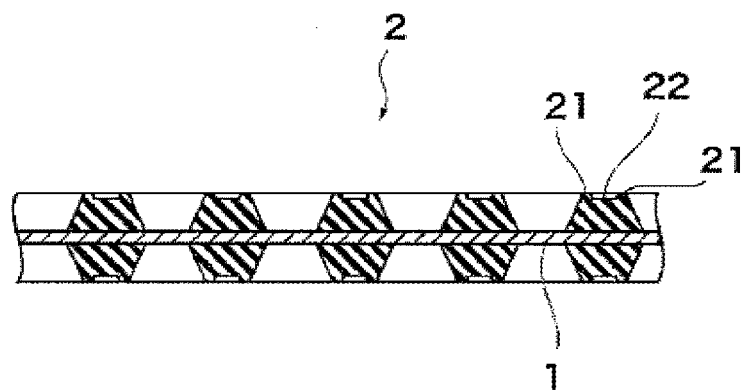
FIG. 9 is a view showing a gasket of a fourth embodiment according to the present invention in the same manner as FIG. 3.
Figure 10:
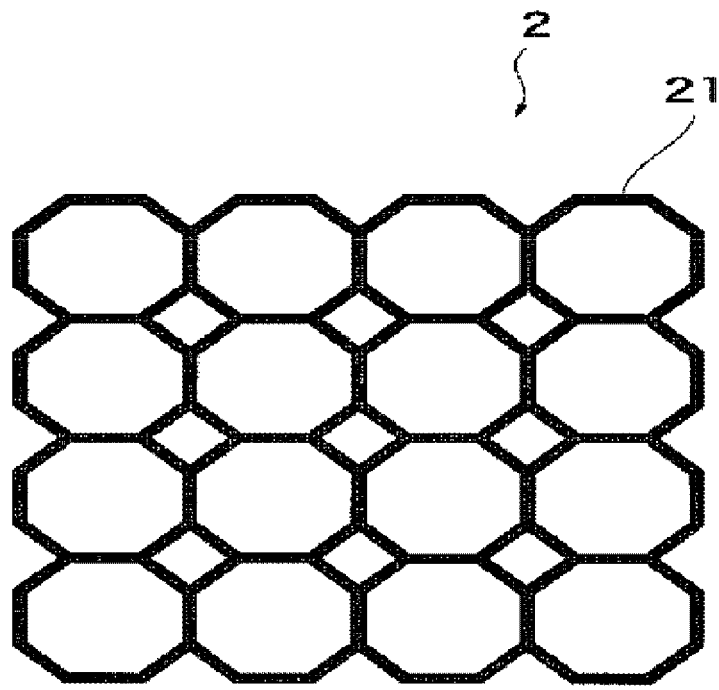
FIG. 10 is a view showing an example of a pattern of a gasket portion.
Figure 11:
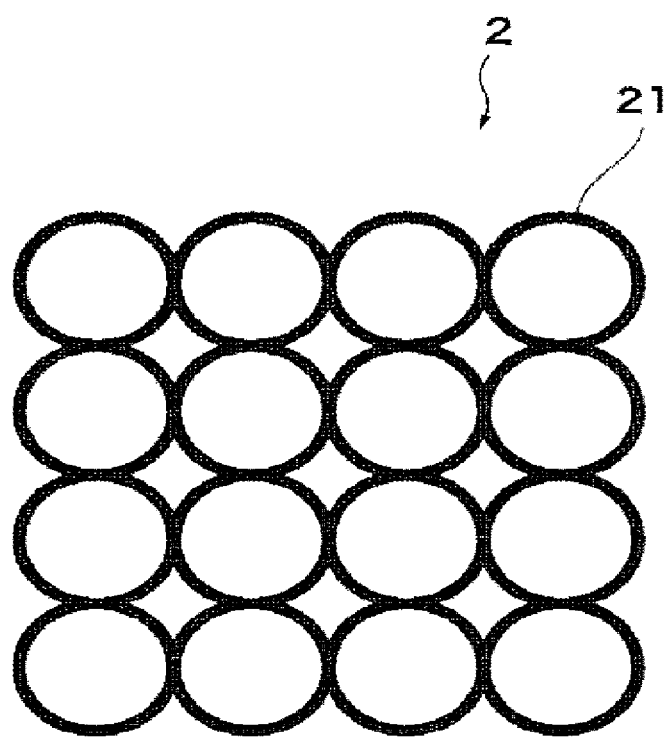
FIG. 11 is a view showing an example of the pattern of the gasket portion.
Figure 12:
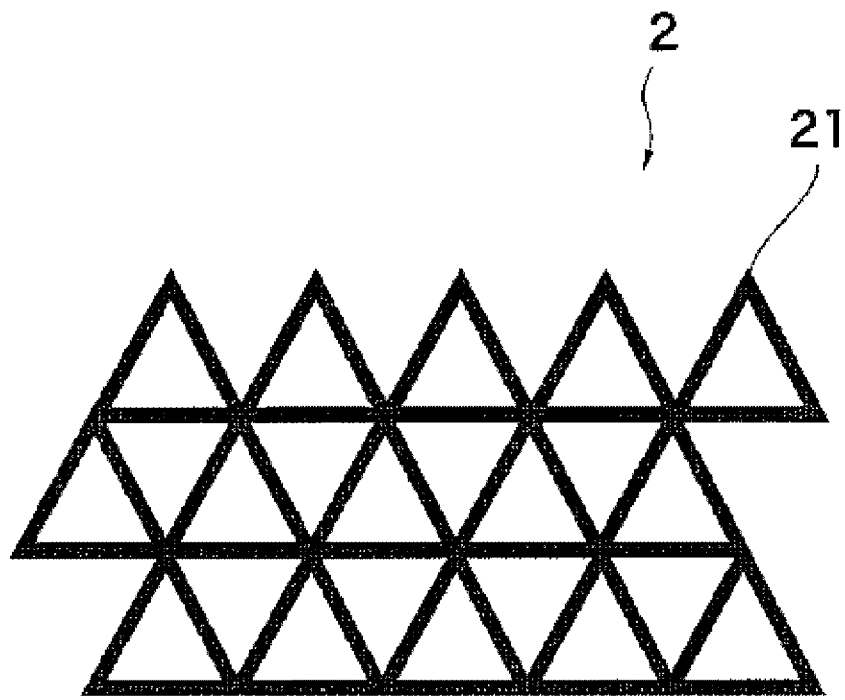
FIG. 12 is a view showing an example of the pattern of the gasket portion.
Figure 13:
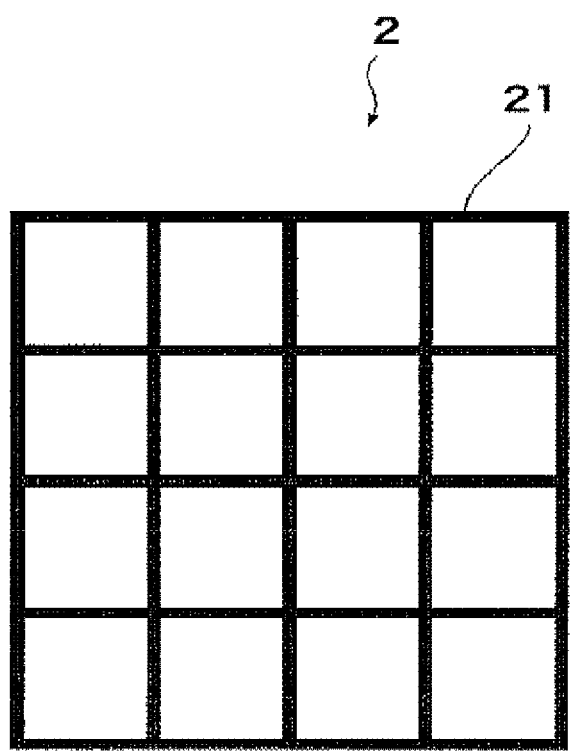
FIG. 13 is a view showing an example of the pattern of the gasket portion.
Figure 14:
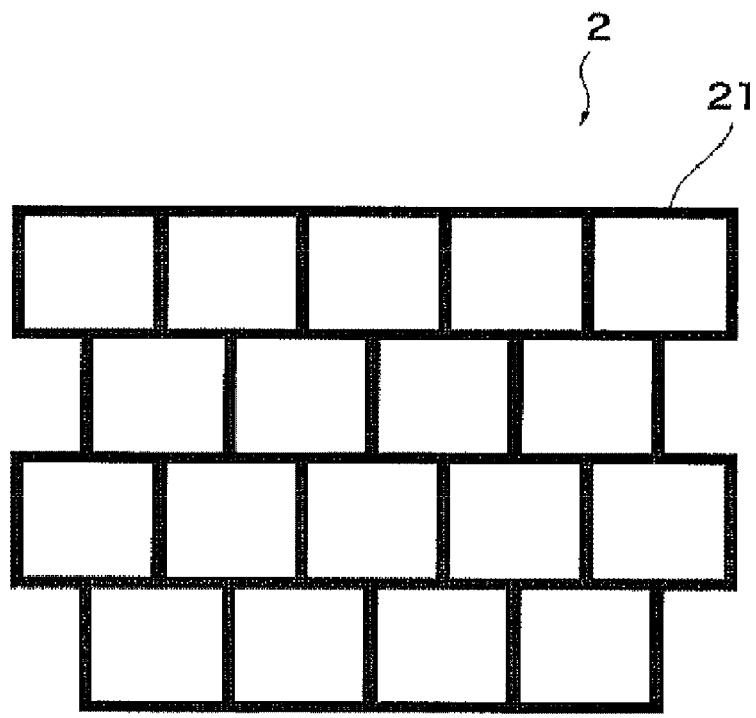
FIG. 14 is a view showing an example of the pattern of the gasket portion.
Figure 15:
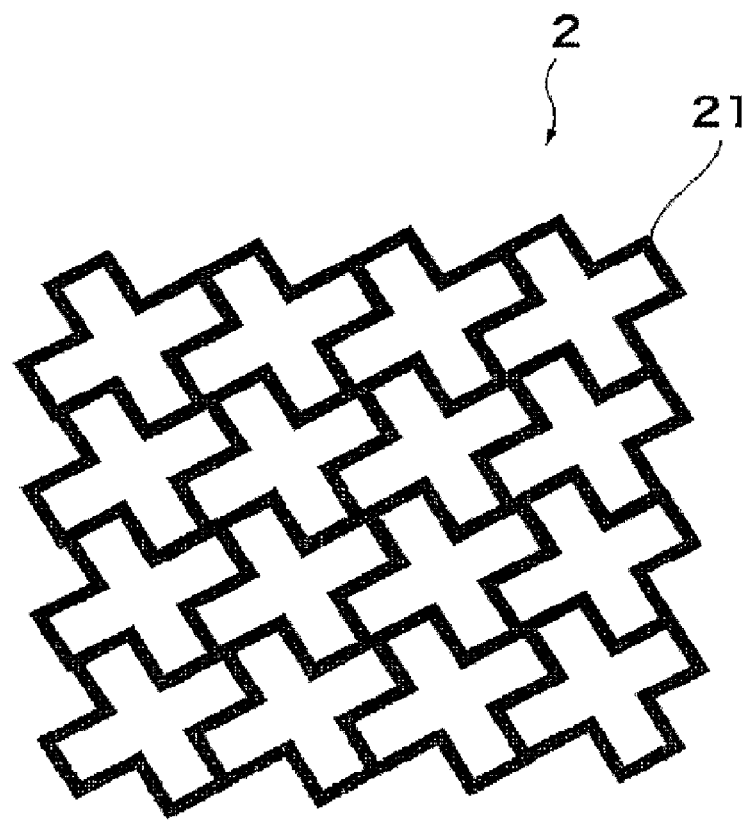
FIG. 15 is a view showing an example of the pattern of the gasket portion.
Figure 16:
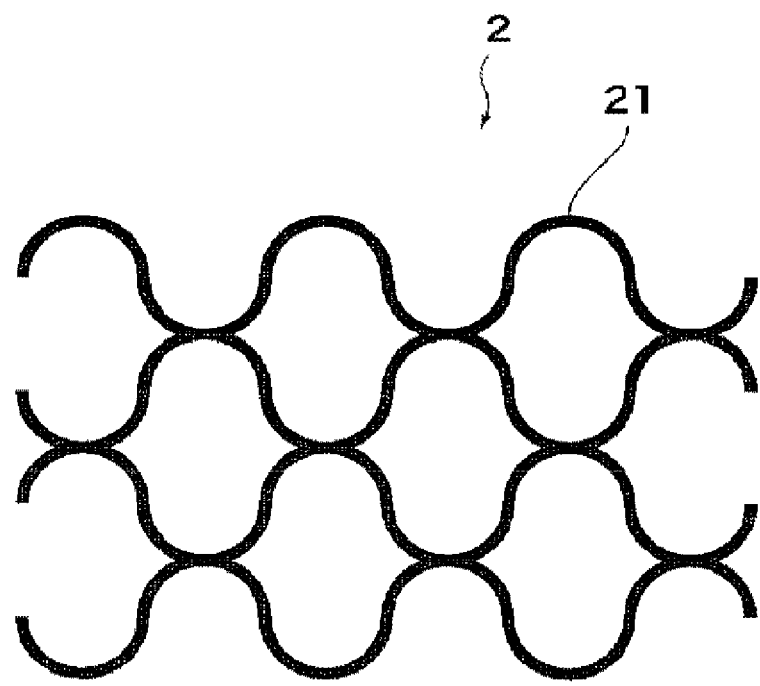
FIG. 16 is a view showing an example of the pattern of the gasket portion.

Next, a description will be given of a gasket of a fourth embodiment according to the present invention on the basis of FIG. 9.

A different point from the gasket of the previously described third embodiment is a point that the positioning projection 22 exists in an integrated state in such a manner as to be pinched by the projection portions 21 and 21.

According to the matter described above, since it is possible to avoid the excessive fastening of the gasket portion 2 even in a narrow sealing space, the good sealing performance can be stably obtained over a long period of time.

The shapes of the gasket portions 21 shown by the embodiments mentioned above are formed such that the hexagonal projection portions 21 are bonded densely to each other, however, various patterns of projection portions 21 can be used by being appropriately selected in correspondence to various intended uses without being limited to the shape.

More specifically, shape patterns shown in FIG. 10 to FIG. 16 are used by being appropriately selected.

In this case, it is necessary that a magnitude of one unit of the pattern of the projection portion 21 is smaller than a minimum width of the target gasket.

Because a continuity of the projection portions 21 is disconnected in the case of forming the gasket having the target width and there is a possibility that the sealing performance is deteriorated.

Next, a description will be given of a manufacturing method of a gasket according to the present invention on the basis of FIG. 17.

Figure 17A:
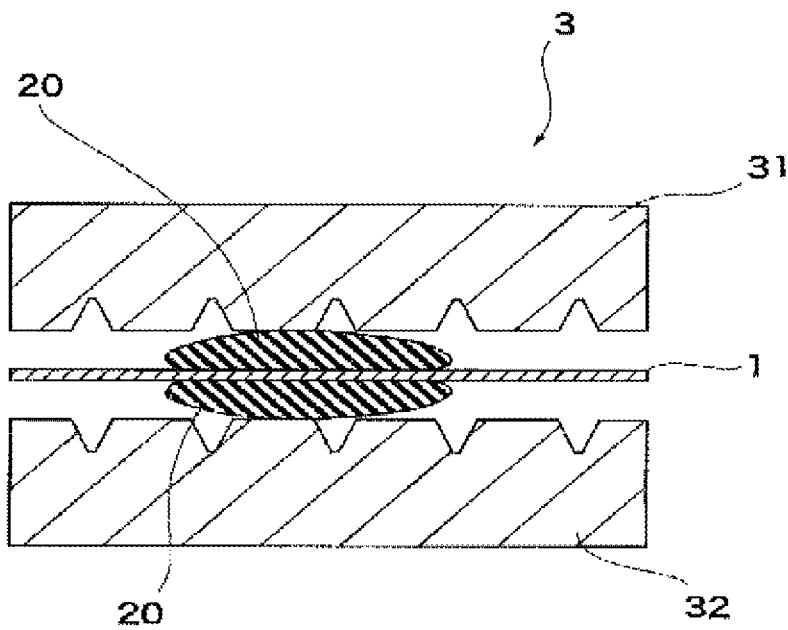
FIG. 17 is a view showing a manufacturing step of a gasket according to the present invention.
Figure 17B:
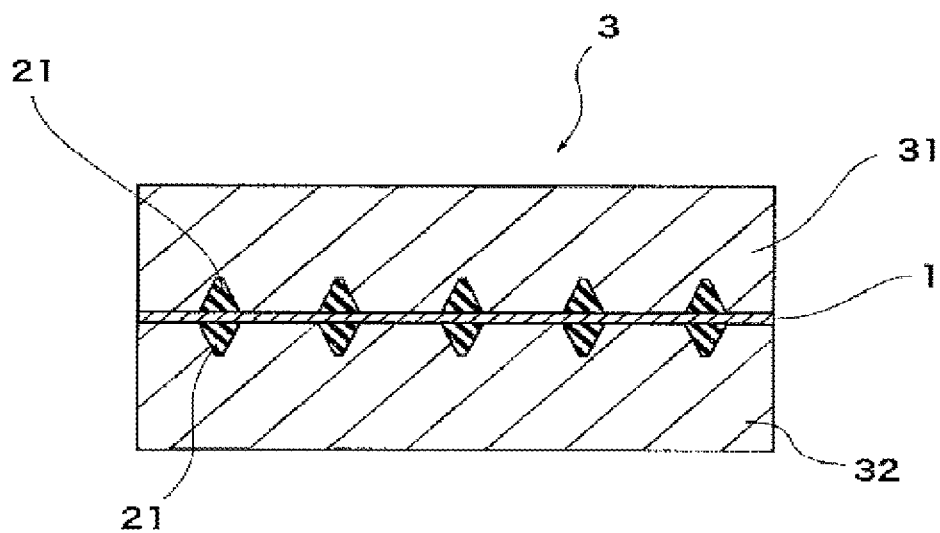
Figure 18:
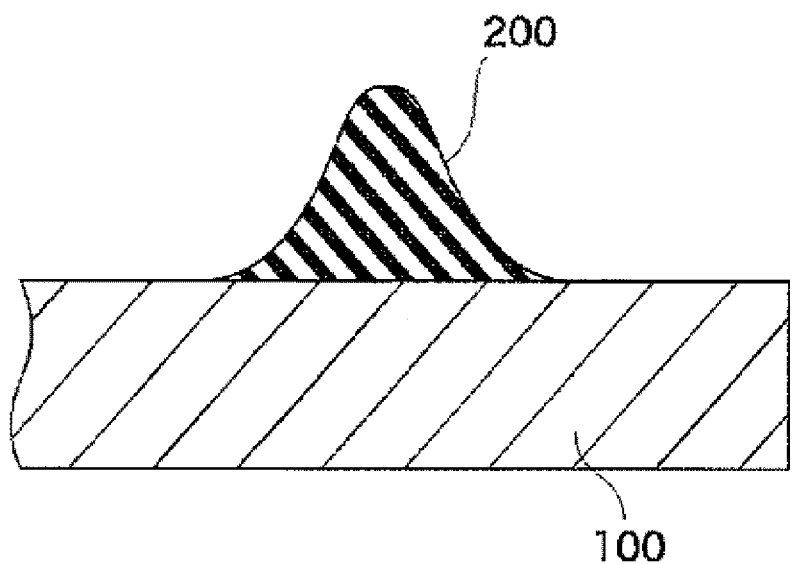
FIG. 18 is a cross sectional view of a substantial part of a gasket according to a prior art.
Figure 19:
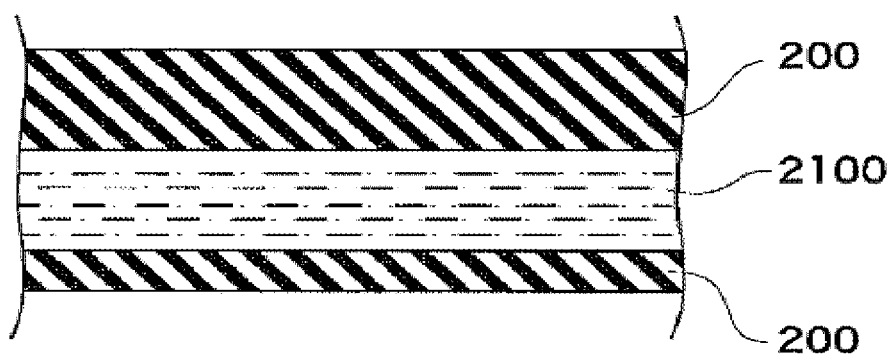
FIG. 19 is a cross sectional view of a substantial part of the other gasket according to the prior art.

As shown in FIG. 17A, rubber materials 20 and 20 are arranged on both the front and back surfaces of the sheet-like base material 1 made of the resin material, between an upper metal mold 31 and a lower metal mold 32, and the upper metal mold 31 and the lower metal mold 32 are closed. Accordingly, as shown in FIG. 17B, the gasket portion 2 which is made of the rubber-like elastic material and is provided with the continuous projection portions 21 having the fixed pattern can be integrally formed while pinching the base material 1 by the upper and lower metal molds 31 and 32.

Next, the target gasket can be obtained by punching the gasket portion 2 including the base material 1 into a fixed shape.

In this case, it is necessary to make the magnitude of one unit of the pattern of the projection portions 21 smaller than the minimum width of the gasket to be punched.

In the present embodiment, the gasket is formed in accordance with a compression molding, however, it is possible to appropriately select and use an injection molding method, a method of forming in such a manner as to pinch the base material by rotary metal molds and the like, without being limited to the compression molding.

Further, it goes without saying that the present invention is not limited to the best mode for carrying out the invention mentioned above, but can employ various structures without deviating from the scope of the present invention.

INDUSTRIAL APPLICABILITY

The gasket structure body according to the present invention can be used for waterproofing an electronic device, waterproofing an engine cam cover and the like.

What is claimed is:

1. A gasket comprising:
   a sheet-like base material;
   a gasket portion which is made of a rubber-like elastic material and is integrally formed on one surface of said base material, said gasket portion including a plurality of continuous projection portions disposed over substantially an entirety of the one surface of said base material, each projection portion being provided with a repeating fixed pattern, and
   a plurality of positioning projections made of a rubber-like elastic material disposed over substantially the entirety of the one surface of said base material, each positioning projection being formed on the one surface of said base material independently of and separately from said projection portions, each positioning projection having a flat top surface which is lower than a height of said projection portions, and each positioning projection is surrounded by one of the continuous projection portions,
   wherein the positioning projections are not continuous with the projection portions such that the projection portions and the positioning projections are completely spaced apart from one another and do not directly contact one another.

* * * * *